United States Patent Office 3,306,916
Patented Feb. 28, 1967

3,306,916
PROCESS FOR PREPARING VINYLCYCLOPENTA-DIENYL MANGANESE TRICARBONYL
John Kozikowski, Walled Lake, Mich., and Michael Cais, Haifa, Israel, assignors to Ethyl Corporation, New York, N.Y., a corporation of Virginia
No Drawing. Original application Dec. 28, 1960, Ser. No. 78,820. Divided and this application May 3, 1965, Ser. No. 463,423
3 Claims. (Cl. 260—429)

This application is a division of application Serial No. 78,820, filed December 28, 1960.

This invention relates to a variety of organometallic compounds and the processes employed in their production. More specifically, this invention relates to compounds and processes involving the use of an acylcyclopentadienyl manganese tricarbonyl compound.

An object of our invention is to provide new organometallic compounds and processes for their preparation. A further object is to provide acylcyclopentadienyl manganese tricarbonyl derivatives and processes for their preparation. Additional objects will become apparent from a reading of the specification and claims which follow.

The objects of this invention are accomplished by preparing vinylcyclopentadienyl manganese tricarbonyl from (1 - hydroxyalkyl)cyclopentadienyl manganese tricarbonyl. The preparation of (1-hydroxyalkyl)cyclopentadienyl manganese tricarbonyl is illustrated in the following example.

Example I (1-hydroxyethyl)cyclopentadienyl manganese tricarbonyl was prepared by treatment of 72 grams (0.293 mole) of acetylcyclopentadienyl manganese tricarbonyl in ether solution with 5.7 grams (0.15 mole) of lithium aluminum hydride. The acetylcyclopentadienyl manganese tricarbonyl was dissolved in 500 ml. of ether and the solid lithium aluminum hydride was added in small portions to the stirred solution at room temperature in an atmosphere of nitrogen. Each addition was accompanied by a small amount of foaming and heat was evolved. The addition was regulated to keep the ether refluxing at a moderate rate and required slightly more than one hour during which time the color changed from red-orange to brown. The mixture was then allowed to stand overnight in a nitrogen atmosphere. Methyl formate was then added dropwise to remove excess lithium aluminum hydride, after which water was added dropwise with caution until there was no further evidence of reaction. The mixture was then filtered, and the organic layer was separated from the filtrate. The solid was acidified and then extracted with ether and the ether extract was combined with the organic layer. The combined extracts were washed with sodium carbonate solution and dried over Drierite. Removal of the ether followed by distillation through a small spinning band column gave 46 grams (0.186 mole) of (1-hydroxyethyl)cyclopentadienyl manganese tricarbonyl, a mobile orange liquid having a boiling point of 104–106° C. at 22 mm. and a refractive index, $n_D^{20}$ of 1.5967. Analysis.—Calcd. for $C_{10}H_9MnO_4$: C, 48.4; H, 3.63; Mn, 22.2. Found: C, 48.6; H, 3.72; Mn, 22.2. The infrared spectrum was characterized by the relatively weak hydroxyl absorption at 2.8–2.9 microns and the disappearance of ketonic absorption at 6.9 microns.

The (1hydroxyalkyl)cyclopentadienyl manganese tricarbonyl compound, formed as in the preceding example, can then be reacted with a dehydration catalyst to form the corresponding vinylcyclopentadienyl manganese tricarbonyl. A preferred dehydration catalyst is potassium hydrogen sulfate. To further illustrate this embodiment of our invention, there is presented the following example.

Example II

Vinylcyclopentadienyl manganese tricarbonyl was prepared by treatment of 18.95 grams (0.076 mole) of (1-hydroxyethyl)cyclopentadienyl manganese tricarbonyl with 1.2 grams of powdered potassium hydrogen sulfate and 200 mg. of tert-butylcatechol added as a polymerization inhibitor. The flask containing these materials was attached to a preheated spinning bank column and the pressure was adjusted to 97 mm. Hg. The band was started and the flask was immersed in an oil bath heated to 170° C. Water was seen collecting in the condenser almost immediately. After 10 minutes the pressure was lowered to —2 mm. and the distillate boiling at 88° C. was removed very rapidly. The yield of crude product was 14.5 grams. A careful refractionation gave 13.7 grams of product as a mobile orange liquid having a boiling point of 88° C. at 3 mm. Analysis.—Calcd. for $C_{10}H_7MnO_3$: C, 52.2; H, 3.04; Mn, 23.9. Found: C, 52.4; H, 3.11; Mn, 23.9 percent. The infrared spectrum of the compound showed characteristic vinyl absorption at 6.1 microns.

The vinylcyclopentadienyl manganese tricarbonyl, as prepared in the preceding example, can be polymerized by heating in a partially evacuated system. This is illustrated by the following example.

Example III

Polymerization of vinylcyclopentadienyl manganese tricarbonyl is carried out by immersing a partially evacuated tube containing the vinyl compound in an oil bath at 170° C. One sample was immersed for 66 hours, and another was immersed 22 hours. The polymer obtained in both samples showed no vinyl absorption in the infrared and was a clear orange, brittle glasslike solid with little resistance to shear. It can be dissolved to benzene or chloroform and films cast from these solutions are clear but brittle. It can be precipitated from benzene by the addition of methanol. The softening point is around 80° C. The polymer reacts slowly with concentrated nitric acid and tends to darken on prolonged exposure to light.

The preparation of an acylcyclopentadienyl manganese tricarbonyl which is employed in preparing (1-hydroxyalkyl)cyclopentadienyl manganese tricarbonyl, as well as the preparation of other related cyclopentadienyl manganese tricarbonyl compounds, is fully described in our copending patent application Serial No. 78,820, filed December 28, 1960.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock, our compounds may be present in the gasoline in combination with typical scavengers such as ethylene dichloride, ethylene dibromide, tricresylphosphate, trimethylphosphate and the like.

The compounds of our invention have further utility as additives to residual and distillate fuels generally, e.g., jet fuels, home heater fuels and diesel fuels, to reduce smoke and/or soot formation. Also, they may be employed as additives to lubricating oils in which case they act to improve the lubricity of the base oil. In addition, they may be employed as additives to solid fuels to control burning rate.

Our compounds are further useful in many metal plating applications. In order to effect metal plating using the compounds, they are decomposed in an evacuated space containing the object to be plated. On decomposition, they lay down a film of metal on the object. The gaseous plating may be carried out in the presence of an inert gas so as to prevent oxidation of the plating metal or the object to the plated during the plating operations.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 grams of bromoacetylcyclopentadienyl manganese tricarbonyl. The tube is heated at 400° C. for one hour after which time it is cooled and opened. The cloth has a uniform metallic grey appearance and exhibits a gain in weight of about 0.02 grams.

A further utility for our compounds is as drying agents in which case the compounds are incorporated in paints, varnish, printing inks, synthetic resins of the drying oil type, oil enamels and the like. A still further utility for our compounds is their use as chemical intermediates in the preparation of metal-containing polymeric materials or in the preparation of new organic materials.

Having fully defined the novel compounds of our invention, their mode of preparation and their many utilities, we desire to be limited only within the lawful scope of the appended claims.

We claim:
1. Process comprising reacting a (1-hydroxyethyl) cyclopentadienyl manganese tricarbonyl compound with a dehydration catalyst, said process being carried out at about 170° C. and in the presence of a polymerization inhibitor.
2. The process of claim 1 in which the dehydration catalyst is potassium hydrogen sulfate.
3. Process comprising reacting (1-hydroxyethyl)cyclopentadienyl manganese tricarbonyl with potassium hydrogen sulfate at about 170° C. and in the presence of tert-butyl catechol as a polymerization inhibitor to form vinyl-cyclopentadienyl manganese tricarbonyl.

References Cited by the Examiner
UNITED STATES PATENTS 2,818,417   12/1957   Brown et al. _____ 260—429

OTHER REFERENCES

Arimoto et al.: J. Am. Chem. Soc. 77, 1955, pages 6295–6.

Cotton et al.: Chem. and Ind. (London), 1958, pages 1368–9.

Emerson: Chem. Reviews 45, 1949, pages 350–1.

Organic Synthesis, collected vol. III, John Wiley & Sons, New York (1955), page 204.

Reimschneider et al.: Chem. Ber., 92, pages 3208–13 (1959).

HELEN M. McCARTHY, *Acting Primary Examiner.*

TOBIAS E. LEVOW, T. L. IAPALUCCI, A. DEMERS,
*Assistant Examiners.*